United States Patent
Griffioen et al.

(10) Patent No.: US 9,191,830 B2
(45) Date of Patent: Nov. 17, 2015

(54) LOCAL WIRELESS CONNECTIVITY FOR RADIO EQUIPMENT OF A BASE STATION IN A CELLULAR COMMUNICATIONS NETWORK

(71) Applicant: Telefonaktiebolaget L M Ericsson (publ), Stockholm (SE)

(72) Inventors: Robert Griffioen, Ottawa (CA); Edwin Vai Hou Iun, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 217 days.

(21) Appl. No.: 13/852,204

(22) Filed: Mar. 28, 2013

(65) Prior Publication Data

US 2014/0295901 A1 Oct. 2, 2014

(51) Int. Cl.
*H04B 7/00* (2006.01)
*H04W 24/02* (2009.01)
*H04W 24/00* (2009.01)
*H04W 64/00* (2009.01)
*H04W 88/08* (2009.01)
*H04W 92/10* (2009.01)

(52) U.S. Cl.
CPC .............. *H04W 24/02* (2013.01); *H04W 24/00* (2013.01); *H04W 64/00* (2013.01); *H04W 88/08* (2013.01); *H04W 92/10* (2013.01)

(58) Field of Classification Search
CPC ............... H04W 52/244; H04W 36/22; H04L 41/0206; H04L 41/00; G01S 5/00; H04Q 3/0062
USPC ........................................................ 455/507
See application file for complete search history.

(56) References Cited

U.S. PATENT DOCUMENTS 4,903,327 A 2/1990 Raghuram et al.
5,963,130 A 10/1999 Schlager et al.
(Continued)

FOREIGN PATENT DOCUMENTS

CN 101272583 A 9/2008
CN 201467461 U 5/2010
(Continued)

OTHER PUBLICATIONS

Author Unknown, "Base transceiver station," Wikipedia, Apr. 21, 2014, retrieved on Jul. 2, 2014 from http://en.wikipedia.org/wiki/Base_transceiver_station, 5 pages.
(Continued)

*Primary Examiner* — Max Mathew
(74) *Attorney, Agent, or Firm* — Withrow & Terranova, PLLC

(57) ABSTRACT

The present disclosure relates to local wireless connectivity for a radio equipment of a base station in a cellular communications network. In one embodiment, the radio equipment includes a radio subsystem that transmits and receives radio signals for the cellular communications network, a local wireless interface, and a controller associated with the local wireless interface that is configured to provide access to a maintenance subsystem of the radio equipment via the local wireless interface. Remote access to the maintenance subsystem of the radio equipment via the local wireless interface allows maintenance operations to be performed without the need to physically connect to the radio equipment via a wired connection, which is difficult in many installations.

21 Claims, 13 Drawing Sheets

(56) References Cited

U.S. PATENT DOCUMENTS

| | | |
|---|---|---|
| 6,782,436 B1 | 8/2004 | Baker |
| 7,061,924 B1 | 6/2006 | Durrant et al. |
| 7,743,984 B2 | 6/2010 | Olsen et al. |
| 7,962,150 B2 | 6/2011 | Hertzog et al. |
| 8,160,617 B2 | 4/2012 | Scales |
| 8,285,302 B1 | 10/2012 | Espy et al. |
| 8,311,545 B2 | 11/2012 | Zhu et al. |
| 2001/0040880 A1 | 11/2001 | Chen et al. |
| 2003/0217155 A1 | 11/2003 | Greck et al. |
| 2004/0139028 A1 | 7/2004 | Fishman et al. |
| 2004/0179512 A1 | 9/2004 | Leblanc et al. |
| 2005/0105552 A1 | 5/2005 | Osterling |
| 2005/0147052 A1 | 7/2005 | Wu |
| 2007/0097874 A1 | 5/2007 | Hughes et al. |
| 2008/0318591 A1 | 12/2008 | Oliver |
| 2008/0320464 A1 | 12/2008 | Wahlstrom et al. |
| 2009/0119468 A1 | 5/2009 | Taylor et al. |
| 2010/0075709 A1 | 3/2010 | Nakano et al. |
| 2010/0085949 A1* | 4/2010 | von Brandt .......... H04W 12/06 370/338 |
| 2010/0110885 A1 | 5/2010 | Qin et al. |
| 2010/0260145 A1 | 10/2010 | Voyer et al. |
| 2011/0059736 A1 | 3/2011 | Norrman et al. |
| 2011/0110293 A1 | 5/2011 | Hart et al. |
| 2011/0111791 A1 | 5/2011 | Martz et al. |
| 2011/0241827 A1* | 10/2011 | Varoglu ................. H04B 7/185 340/5.52 |
| 2012/0213108 A1 | 8/2012 | Ji et al. |
| 2012/0309416 A1* | 12/2012 | Whelan ................. G01S 5/0205 455/456.1 |
| 2012/0329511 A1 | 12/2012 | Keisu |
| 2013/0010606 A1 | 1/2013 | Vikberg et al. |
| 2013/0021986 A1 | 1/2013 | Bhattad et al. |
| 2013/0231061 A1 | 9/2013 | Griffioen |
| 2014/0293768 A1 | 10/2014 | Griffioen |
| 2014/0295793 A1 | 10/2014 | Griffioen et al. |

FOREIGN PATENT DOCUMENTS

| | | |
|---|---|---|
| CN | 102395219 A | 3/2012 |
| EP | 0967817 A2 | 12/1999 |
| EP | 1377104 A1 | 1/2004 |
| EP | 2073582 A1 | 6/2009 |
| EP | 2421330 A2 | 2/2012 |
| JP | 2002279094 A | 9/2002 |
| WO | 9300754 A1 | 1/1993 |
| WO | 9517686 A1 | 6/1995 |
| WO | 9901993 A2 | 1/1999 |
| WO | 9923508 A1 | 5/1999 |
| WO | 2005114604 A2 | 12/2005 |
| WO | 2010000176 A1 | 1/2010 |
| WO | 2011013029 A2 | 2/2011 |
| WO | 2011137638 A1 | 11/2011 |
| WO | 2012037869 A1 | 3/2012 |
| WO | 2012149765 A1 | 11/2012 |
| WO | 2012171184 A1 | 12/2012 |
| WO | 2013128334 A1 | 9/2013 |

OTHER PUBLICATIONS

Invitation to Pay Additional Fees for PCT/IB2014/059601, mailed Jul. 9, 2014, 7 pages.

International Search Report and Written Opinion for PCT/IB2014/059601, mailed Aug. 27, 2014, 19 pages.

International Search Report and Written Opinion for PCT/IB2014/059602, mailed Jul. 9, 2014, 13 pages.

International Search Report and Written Opinion for PCT/IB2014/059603, mailed Jul. 10, 2014, 15 pages.

Author Unknown, "A Practical Approach to Identifying and Tracking Unauthorized 802.11 Cards and Access Points," Interlink Networks, Inc., Revision C, Copyright 2002, 26 pages, http://www.interlinknetworks.com/graphics/news/wireless_detection_and_tracking.pdf.

Author Unknown, "Best Practices for Rogue Detection and Annihilation," AirMagnet—A Technical Whitepaper, Nov. 2004, 18 pages, http://www.airmagnet.com/assets/whitepaper/Rogue_Detection_White_Paper.pdf.

Ericsson AB, "Common Public Radio Interface (CPRI) Interface Specification," CPRO Specification, V4.0, Jun. 30, 2008, 96 pages.

Author Unknown, "Rogue Access Point Detection: Automatically Detect and Manage Wireless Threats to Your Network," White Paper—Proxim Wireless Networks, Copyright: 2004, 7 pages, http://www.sourcesecurity.com/docs/moredocs/proximmicrosite/Rogue_Access_Point_Detection.pdf Bandal, Ganesh B. et al., "Rogue Access Point Detection System in Wireless LAN," International Journal of Computer Technology and Electronics Engineering (IJCTEE), vol. 2, Issue 5, Oct. 2012, pp. 6-10, http://www.ijctee.org/files/VOLUME2ISSUE5/IJCTEE_1012_02.pdf.

Ericsson AB, "Common Public Radio Interface (CPRI); Interface Specification," CPRI Specification, V5.0, Sep. 21, 2011, 119 pages, http://www.cpri.info/downloads/CPRI_v_5_0_2011-09-21.pdf.

International Search Report for PCT/IB2013/051349, mailed Jun. 28, 2013, 4 pages.

Non-Final Office Action for U.S. Appl. No. 13/971,885, mailed Mar. 3, 2015, 19 pages.

Notice of Allowance for U.S. Appl. No. 13/927,417, mailed Jan. 28, 2015, 9 pages.

International Preliminary Report on Patentability for PCT/IB2014/059601, mailed Oct. 8, 2015, 14 pages.

International Preliminary Report on Patentability for PCT/IB2014/059602, mailed Oct. 8, 2015, 10 pages.

International Preliminary Report on Patentability for PCT/IB2014/059603, mailed Oct. 8, 2015, 13 pages.

Final Office Action for U.S. Appl. No. 13/971,885, mailed Jul. 16, 2015, 24 pages.

Advisory Action and Examiner-Initiated Interview Summary for U.S. Appl. No, 13/971,885, mailed Oct. 6, 2015, 4 pages.

* cited by examiner

LOCAL WIRELESS CONNECTIVITY FOR RADIO EQUIPMENT OF A BASE STATION IN A CELLULAR COMMUNICATIONS NETWORK

FIELD OF THE DISCLOSURE

The present disclosure relates to radio equipment of a base station in a cellular communications network and more particularly relates to local wireless connectivity for a radio equipment of a base station in a cellular communications network.

BACKGROUND

Cellular communications networks include tens to hundreds of base stations installed at various locations. Two conventional installations are illustrated in FIGS. 1 and 2. Specifically, FIG. 1 illustrates a conventional tower-top mounted installation 10 of a base station. As illustrated, the base station includes a Remote Radio Equipment (RRE) 12 connected to a Radio Equipment Controller (REC) 14. The RRE 12 is mounted at a top of a tower 16 and located between 0 to 20 kilometers (km) from the REC 14. The RRE 12 transmits downlink radio signals and receives uplink radio signals from wireless devices, such as a wireless device (WD) 18, located within a coverage area of the RRE 12. The coverage area of the RRE 12 may be a cell served by the base station or a sector of a cell served by the base station. In this example, the base station is a macro or high power base station where the coverage area of the RRE 12 extends from 0 to 10 km from the tower 16. FIG. 2 illustrates a conventional roof-top mounted installation 20 of the base station. In this example, the base station includes two RREs 12 connected to the REC 14. However, in the roof-top mounted installation 20, the RREs 12 are mounted at the top of a building 22, and the REC 14 is located in the basement or cellar of the building 22.

One issue with conventional base station installations such as those of FIGS. 1 and 2 is that the RRE(s) 12 is(are) difficult to reach when maintenance is needed. More specifically, in tower-top mounted installations, the RRE(s) 12 is(are) located at the top of the tower 16 at a height that is typically in the range of 20 to 100 meters (m). As such, when maintenance or field support personnel need to connect to the RRE(s) 12 to perform maintenance operations, the personnel may need to arrange access to the property on which the tower 16 is located and must then climb the tower 16. This is of course time consuming and expensive and creates a significant amount of risk of physical injury to the personnel and potential liability of the cellular communications network operator. Similarly, in roof-top mounted installations, the RRE(s) 12 is(are) located at the top of the building 22. As such, when maintenance or field personnel need to connect to the RRE(s) 12 to perform maintenance operations, the personnel must typically arrange access to the roof-top of the building 22 and potentially climb a mast mounted to the roof-top of the building 22. Again, this is of course time consuming and expensive and creates a significant amount of risk of physical injury to the personnel and potential liability of the cellular communications network operator. As such, there is a need for systems and methods that provide easy and efficient access to RREs for maintenance and field support personnel.

Another issue that arises with respect to installation of base stations relates to subsequent location and identification of RREs. More specifically, mobile data traffic is exploding at a 60% rate of increase every year. In order to meet this demand, small, or low power, base stations (e.g., micro and pico base stations) can be used, particularly in areas with very dense usage. It is desirable to scatter large numbers of small base stations in order to provide high data rates to a large number of users. As an example, FIG. 3 illustrates a number of small base stations, where each small base station includes three RREs (sRREs) 24 each serving a different sector 26 of a cell 28 served by the small base station. When these small base stations are scattered and used in large numbers, it is difficult to manage the locations and identities of the sRREs 24 of the small base stations. For instance, in an extreme case, the sRREs 24 for the small base stations are deployed in a temporary ad-hoc network to provide increased capacity for, as an example, a sporting event or a conference. As illustrated in FIG. 4, in a typical installation, each sRRE 24 includes a remote radio unit 30 and an antenna 32 mounted on a pole 34, or mast.

During network planning and inventory, it is necessary to associate particular sRREs 24 with corresponding planned physical locations for the sRREs 24. However, when installing the sRREs 24, particularly for a temporary ad-hoc network, the physical locations at which the sRREs 24 are actually installed, or deployed, may not match the planned physical locations for the sRREs 24. Similarly, the actual sRRE 24 deployed at a physical location may not match the sRRE 24 planned for that physical location. This may occur due to, for example, human error and/or on-site adjustments made by field support personnel. Thereafter, when problems arise, the maintenance or field support personnel may not be able to locate and identify a particular sRRE 24 to perform corrective action in a timely manner. Further, even when the physical location of an sRRE 24 is found, multiple sRREs 24 are oftentimes installed at the same physical location in order to cover different sectors of the same cell 28, in which case the maintenance or field support personnel cannot easily identify the particular sRRE 24 of interest. As such, there is also a need for systems and methods that enable easy and accurate location and identification of deployed sRREs.

SUMMARY

The present disclosure relates to local wireless connectivity for a radio equipment of a base station in a cellular communications network. In one embodiment, the radio equipment includes a radio subsystem that transmits and receives radio signals for the cellular communications network, a local wireless interface, and a controller associated with the local wireless interface that is configured to provide access to a maintenance subsystem of the radio equipment via the local wireless interface. Remote access to the maintenance subsystem of the radio equipment via the local wireless interface allows maintenance operations to be performed without the need to physically connect to the radio equipment via a wired connection, which is difficult in many installations.

In one embodiment, a local wireless connection is established between the radio equipment and a wireless device, and the radio equipment provides access to the maintenance subsystem of the radio equipment for the wireless device via the local wireless connection. In one embodiment, the controller establishes the local wireless connection to the wireless device via the local wireless interface of the radio equipment. In one particular embodiment, the controller establishes the local wireless connection to the wireless device by connecting to a hotspot hosted by the wireless device. In another embodiment, the controller establishes a hotspot wherein the wireless device establishes the local wireless connection to the radio equipment by connecting to the hotspot.

In one embodiment, in order to provide access to the maintenance subsystem of the radio equipment, the controller receives a request from the wireless device via the local wireless connection and, in response, performs one or more actions indicated by the maintenance request.

In another embodiment, the controller receives a physical location of the wireless device via the local wireless connection and stores the physical location of the wireless device as a physical location of the radio equipment.

In one embodiment, a wireless device includes a local wireless interface and a controller associated with the local wireless interface that is configured to access a maintenance subsystem of a radio equipment of a base station of cellular communications network via the local wireless interface. Remote access to the maintenance subsystem of the radio equipment via the local wireless interface allows an operator of the wireless device to perform maintenance operations without the need to physically connect to the radio equipment via a wired connection, which is difficult in many installations.

In one embodiment, the controller accesses the maintenance subsystem of the radio equipment via a local wireless connection established between the wireless device and the radio equipment via the local wireless interface. In one particular embodiment, the controller creates a hotspot via the local wireless interface, and the local wireless connection is a connection made to the hotspot by the radio equipment. In another embodiment, the controller controls the local wireless interface of the wireless device to connect to a hotspot hosted by the radio equipment.

In one embodiment, the controller accesses the maintenance subsystem of the radio equipment by sending a maintenance request to the maintenance subsystem of the radio equipment via the local wireless connection.

In another embodiment, the controller obtains a physical location of the wireless device and sends the physical location of the wireless device to the maintenance subsystem of the radio equipment as a physical location of the radio equipment via the local wireless interface. Still further, in one embodiment, the wireless device updates a remote database to include the physical location of the wireless device as the physical location of the radio equipment and, in some embodiments, a unique identifier of the radio equipment such as, for example, a Media Access Control (MAC) address of a local wireless interface of the radio equipment. Updating the remote database in this manner enables maintenance or field support personnel to quickly and accurately locate and identify the radio equipment.

In another embodiment, a wireless device includes a local wireless interface and a controller associated with the local wireless interface that is configured to obtain a unique identifier of a radio equipment of a base station of a cellular communications network via the local wireless interface, obtain a physical location of the wireless device, and update a remote database to include the unique identifier of the radio equipment of the base station and the physical location of the wireless device as a physical location of the radio equipment. In one embodiment, the unique identifier of the radio equipment is a MAC address of a local wireless interface of the radio equipment. Updating the remote database in this manner enables maintenance or field support personnel to quickly and accurately locate and identify the radio equipment.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
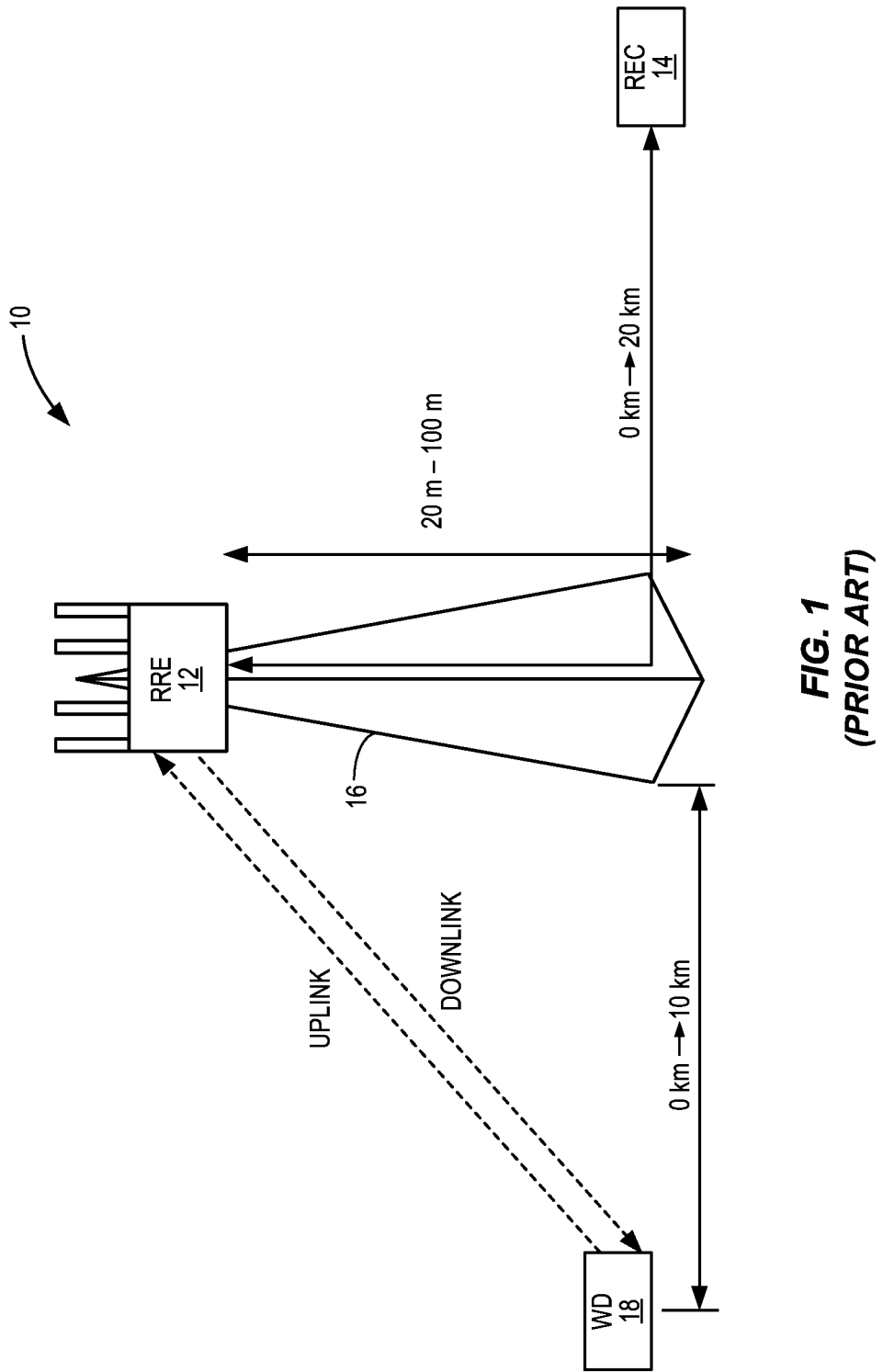
FIG. 1 illustrates one conventional installation of a base station including a Radio Equipment Controller (REC) and Remote Radio Equipment (RRE)
Figure 2:
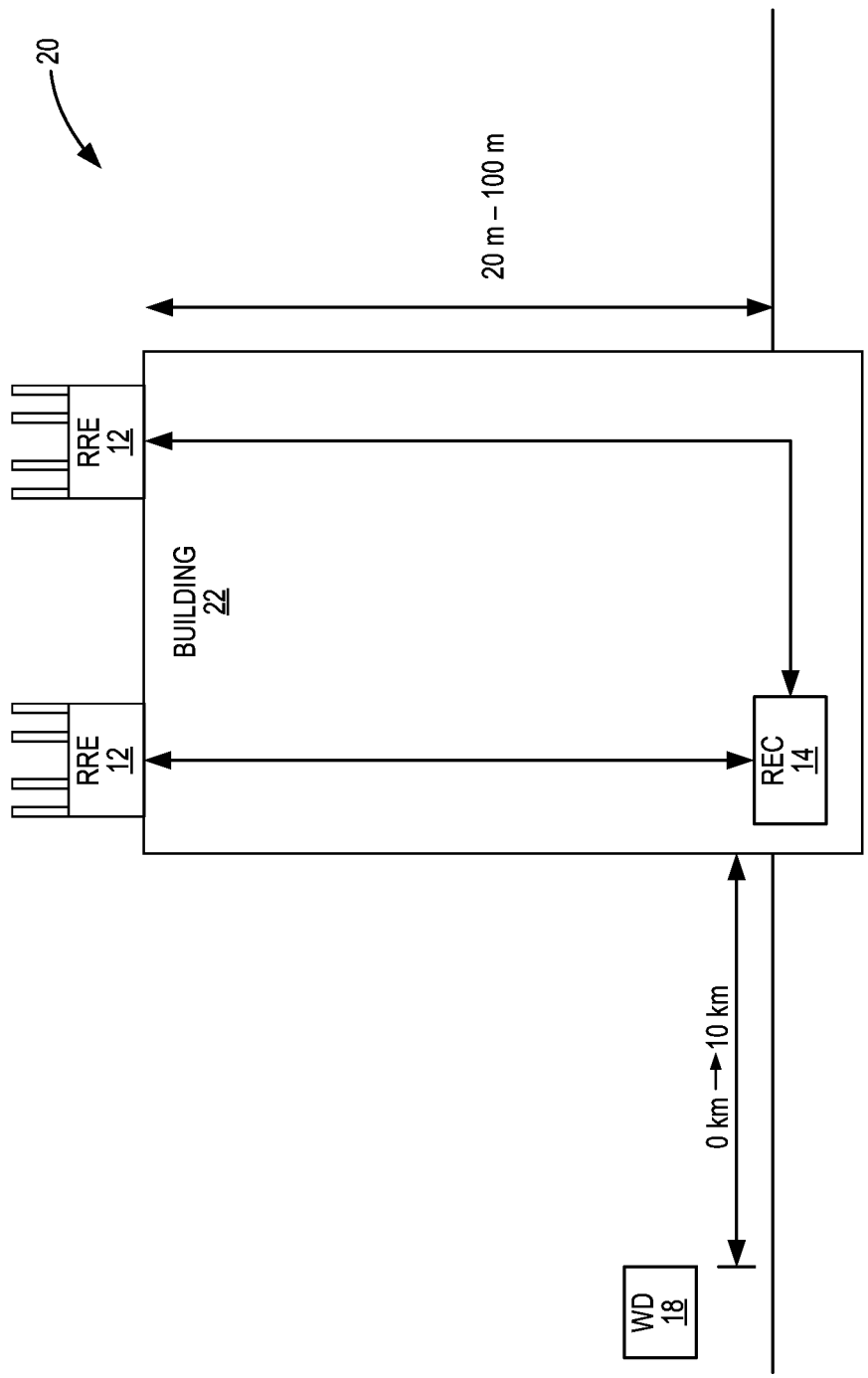
FIG. 2 illustrates another conventional installation of a base station including an REC and an RRE.
Figure 3:
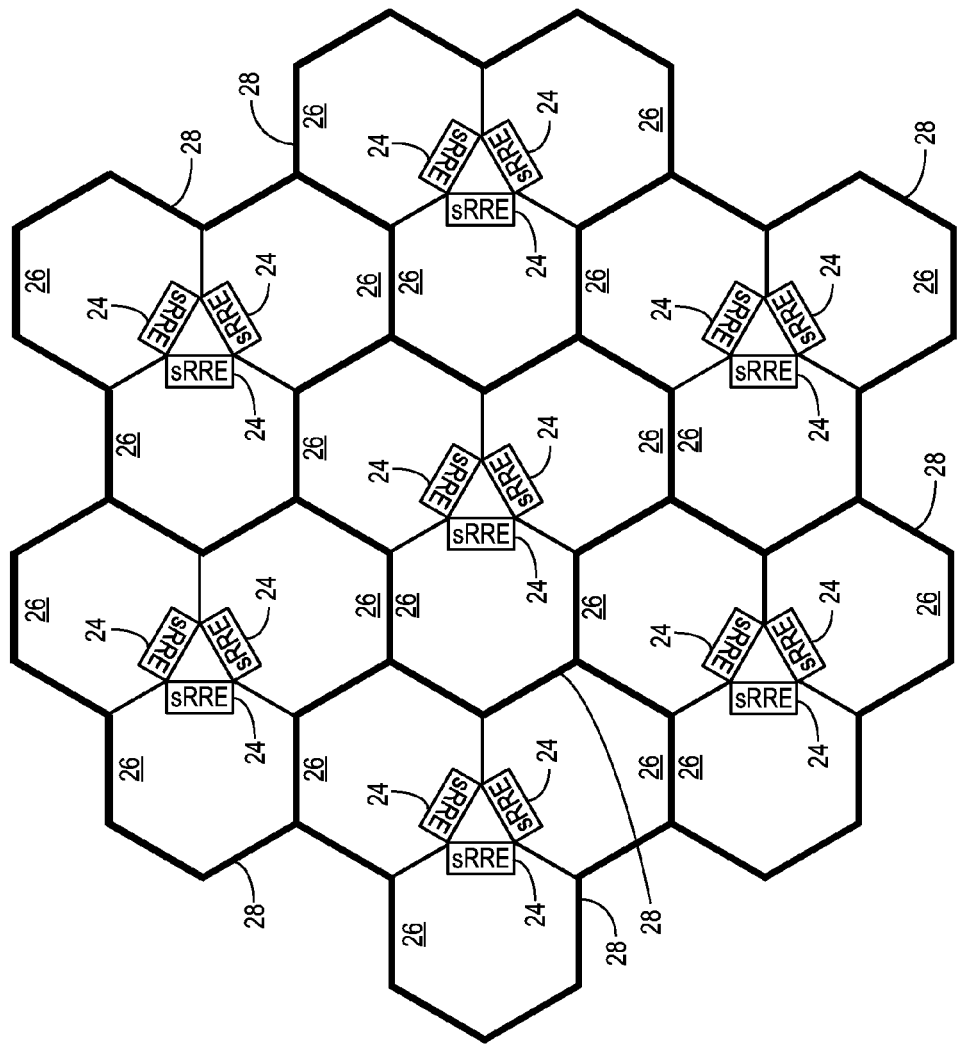
FIG. 3 illustrates a number of small, or low power, RREs that serve a coverage area within a cellular communications network.
Figure 4:
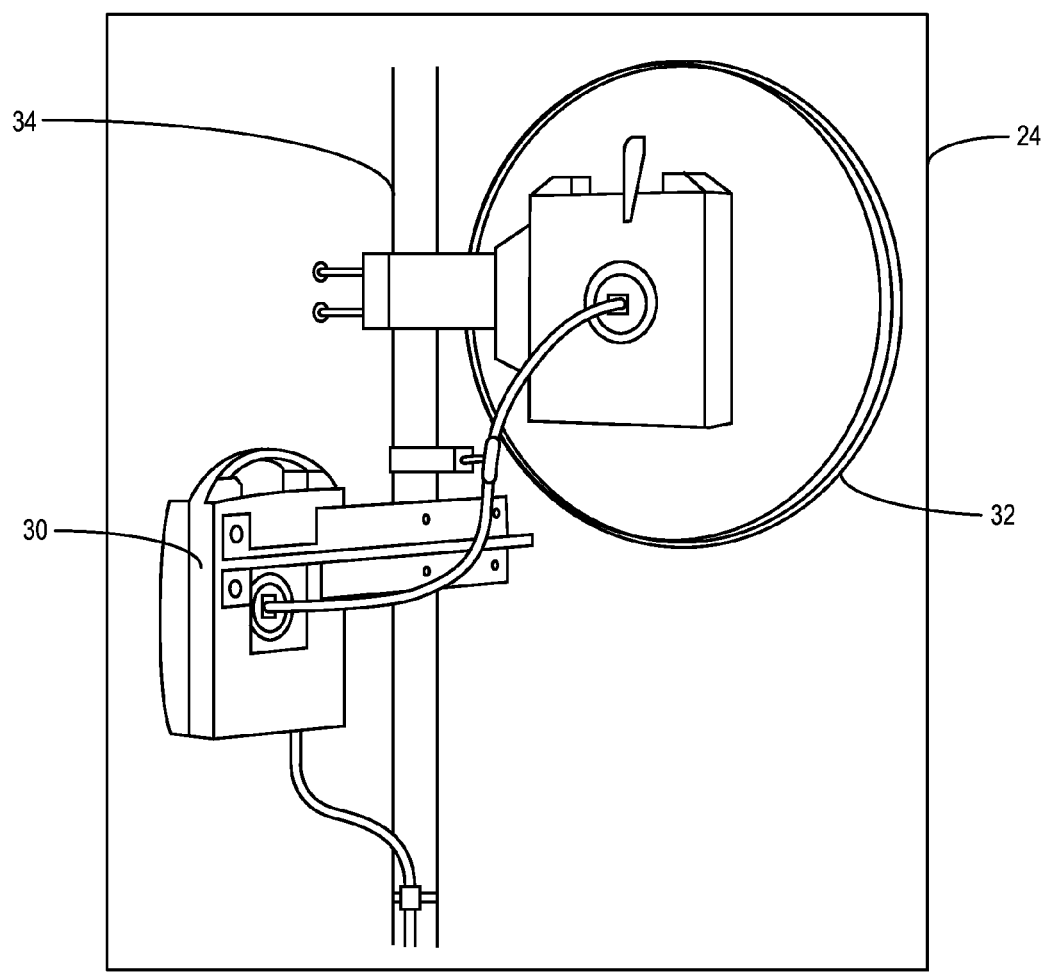
FIG. 4 illustrates one conventional installation of a small, or low power, RRE.
Figure 5:
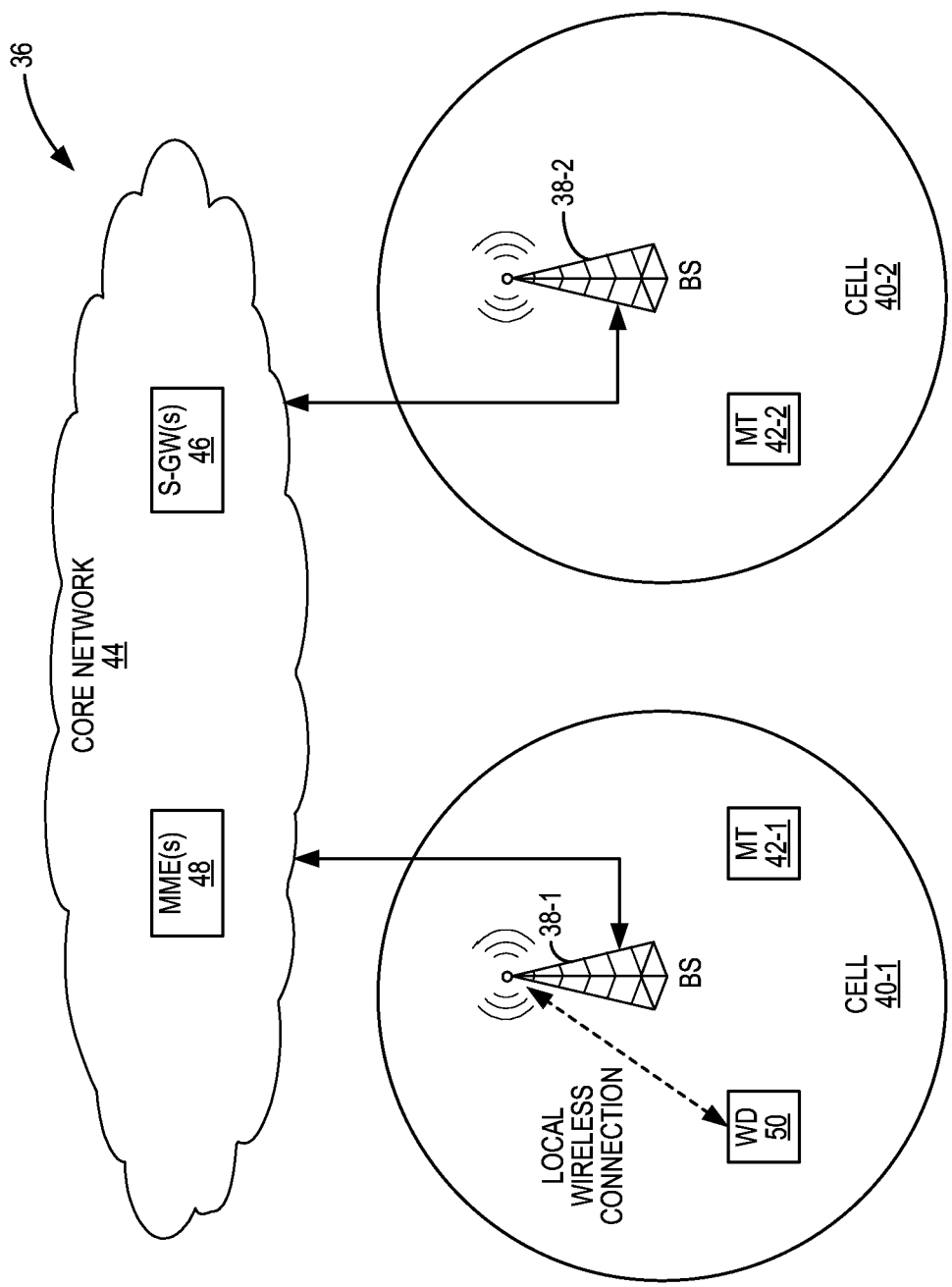
FIG. 5 illustrates a cellular communications network in which a local wireless connection is utilized to enable a wireless device to remotely access a maintenance subsystem of an RRE of a base station according to one embodiment of the present disclosure.

The present disclosure relates to local wireless connectivity for a radio equipment of a base station in a cellular communications network. In this regard, FIG. 5 illustrates a cellular communications network 36 according to one embodiment of the present disclosure. In this particular embodiment, the cellular communications network 36 is a $3^{rd}$ Generation Partnership Project (3GPP) Long Term Evolution (LTE) cellular communications network and, as such, some of the terminology used herein may be specific to 3GPP LTE cellular communications networks. However, the present disclosure is not limited to 3GPP LTE cellular communications networks. Rather, the systems and methods disclosed herein may be utilized in any type of cellular communications network.

As illustrated in FIG. 5, the cellular communications network 36 includes a Radio Access Network (RAN), which includes base stations (BSs) 38-1 and 38-2 (more generally referred to herein collectively as base stations 38 and individually as base station 38) that serve corresponding cells 40-1 and 40-2 (more generally referred to herein collectively as cells 40 and individually as cell 40) of the cellular communications network 36. In one embodiment, the base stations 38-1 and 38-2 are macro base stations (e.g., eNodeBs in a 3GPP LTE cellular communications network). In another embodiment, one or more of the base stations 38-1 and 38-2 are small, or low power, base stations (e.g., micro or pico base stations in a 3GPP heterogeneous cellular communications network). A small base station transmits at lower power levels than a large base station. For example, in one embodiment, small base stations transmit at power levels of less than 5 Watts (W).

The base station 38-1 serves mobile terminals, such as a mobile terminal (MT) 42-1, as well as other types of cellular network enabled devices (e.g., a computer equipped with a cellular network interface) located in the cell 40-1. As such, the base station 38-1 is referred to herein as a serving base station 38-1 of the mobile terminal 42-1. In a similar manner, the base station 38-2 serves mobile terminals, such as a mobile terminal 42-2, as well as other types of cellular network enabled devices located in the cell 40-2. As such, the base station 38-2 is referred to herein as a serving base station 38-2 of the mobile terminal 42-2. The mobile terminals 42-1 and 42-2 are generally referred to herein as mobile terminals 42. While only two base stations 38-1 and 38-2 and two mobile terminals 42-1 and 42-2 are illustrated in FIG. 5 for clarity and ease of discussion, it will be readily appreciated that the cellular communications network 36 includes numerous base stations 38 and numerous mobile terminals 42.

The cellular communications network 36 also includes a core network 44 that includes one or more Serving Gateways (S-GWs) 46 and one or more Mobility Management Entities (MMEs) 48. In LTE, the base stations 38-1 and 38-2 are connected to the same or different S-GWs 46 via corresponding S1-u connections and connected to the same or different MMEs 48 via corresponding S1-c connections. Similarly, in this embodiment, the base stations 38-1 and 38-2 may be connected to one another via an X2 connection. The S-GWs 46 are user plane nodes connecting the core network 44 to the RAN. Among other things, the S-GWs 46 serve as mobility anchors when mobile terminals, such as the mobile terminals 42-1 and 42-2, move between cells as well as mobility anchors for other 3GPP technologies (e.g., Global System for Mobile Communications (GSM)/General Packet Radio Service (GPRS) and High Speed Packet Access (HSPA)). The MMEs 48 are control plane nodes of the core network 44. The responsibilities of the MMEs 48 include connection/release of bearers to mobile terminals, handling of idle to active transitions, and handling of security keys.

As discussed below in detail, some or all of the base stations 38 are equipped with local wireless interfaces that enable local wireless connectivity to nearby wireless devices in order to enable remote access to maintenance subsystems of the base stations 38. As used here, a "local wireless interface" is a wireless interface that enables communication via a local wireless connection. Further, a "local wireless connection" is direct point-to-point wireless connection between two devices. Some examples of a local wireless interface are IEEE 802.11a, IEEE 802.11b, IEEE 802.11g, and 802.11n wireless interfaces. In this illustrated example, a wireless device (WD) 50 is enabled to remotely access a maintenance subsystem of a radio equipment of the base station 38-1 via a local wireless connection between the radio equipment of the base station 38-1 and the wireless device 50. In this manner, an operator, or user, of the wireless device 50 (e.g., a maintenance or field support person) is enabled to access the maintenance subsystem of the base station 38-1 without the need to climb a tower and/or access rental property. In addition or alternatively, the local wireless connection enables maintenance or field support personnel to quickly and easily locate and identify base stations 38 of interest, as discussed below in detail. The wireless device 50 may be any type of device having a local wireless interface such as, for example, a notebook computer, a tablet computer, a smart phone, or the like.

Figure 6:
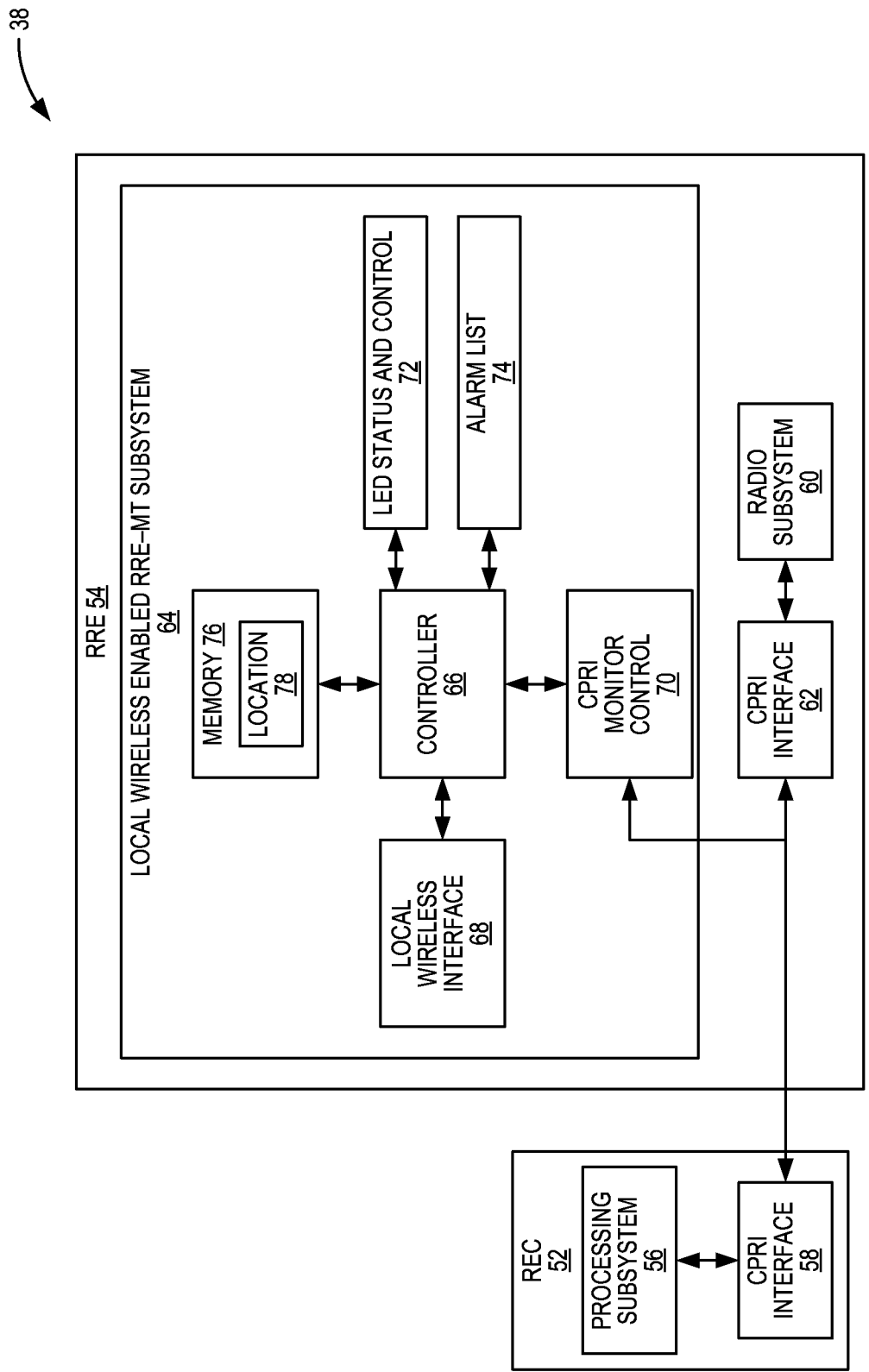
FIG. 6 is a block diagram of one of the base stations of FIG. 5 where the base station includes an RRE having a local wireless interface that provides remote access to the maintenance subsystem of the RRE according to one embodiment of the present disclosure.

FIG. 6 is a block diagram that illustrates one of the base stations 38 of FIG. 5 in more detail according to one embodiment of the present disclosure. In this embodiment, the base station 38 includes a Radio Equipment Controller (REC) 52 and a Remote Radio Equipment (RRE) 54. Notably, as used herein, a Radio Equipment (RE) is a general term that encompasses both RREs and REs that are co-located with their corresponding RECs, whereas an RRE is a RE that is physically separated from the corresponding REC (i.e., a separate device that is separated from the REC by some distance). The RRE 54 may be installed on a tower, on a roof-top of a building, or the like, and the REC 52 is physically separated from the RRE 54 by some distance. The distance between the REC 52 and the RRE 54 may be, for example, a distance up to about 20 kilometers (km). In this example, the REC 52 and the RRE 54 are connected by a fiber optic cable and communicate over the fiber optic cable according to the Common Public Radio Interface (CPRI) specification. While not essential for understanding the concepts disclosed and claimed herein, for more information regarding the CPRI specification, the interested reader is directed to the CPRI Specification v5.0 published on Sep. 21, 2011.

As illustrated, the REC 52 includes a processing subsystem 56 and a CPRI interface 58. The processing subsystem 56 generally operates to perform baseband processing for the base station 38. In particular embodiments, the processing subsystem 56 may comprise, for example, one or several general-purpose or special-purpose microprocessors or other microcontrollers programmed with suitable software and/or firmware to carry out some or all of the functionality of the REC 52. In addition or alternatively, the processing subsystem 56 may comprise various digital hardware blocks (e.g., one or more Application Specific Integrated Circuits (ASICs), one or more off-the-shelf digital and analog hardware components, or a combination thereof) configured to carry out some or all of the functionality of the REC 52. Additionally, in particular embodiments, the functionality of the REC 52 may be implemented, in whole or in part, by the processing subsystem 56 executing software or other instructions stored on a non-transitory computer-readable medium, such as Random Access Memory (RAM), Read Only Memory (ROM), a magnetic storage device, an optical storage device, or any other suitable type of data storage components. The CPRI interface 58 enables communication between the REC 52 and the RRE 54 via a CPRI link. Notably, the REC 52 typically includes additional components that are not illustrated in FIG. 6 such as, for example, one or more interfaces that enable connection of the base station 38 to other base stations 38 and/or one or more interfaces that enable connection of the base station 38 to the core network 44 (FIG. 5).

The RRE 54 includes a radio subsystem 60 and a CPRI interface 62. As discussed above, the REC 52 provides the digital baseband functionality of the base station 38. The radio subsystem 60 generally provides the analog functionality of the base station 38 (e.g., upconversion, filtering, and amplification). In operation, for the downlink direction, the RRE 54 receives digital baseband signals from the REC 52 via the CPRI interface 62. The radio subsystem 60 then processes the digital baseband signals to generate corresponding radio signals that are transmitted by the RRE 54. Conversely, for the uplink direction, the radio subsystem 60 receives radio signals and generates corresponding baseband signals. The baseband signals are provided to the REC 52 via the CPRI interface 62. The baseband signals are then processed by the REC 52.

In addition to the radio subsystem 60 and the CPRI interface 62, the RRE 54 includes a local wireless enabled RRE-Maintenance Tool (RRE-MT) subsystem 64 (hereinafter simply referred to as the "RRE-MT subsystem 64"). In this embodiment, the RRE-MT subsystem 64 includes a controller 66, a local wireless interface 68, a CPRI monitor control subsystem 70, a Light Emitting Diode (LED) status and control component 72, an alarm list 74, and memory 76. The controller 66 may be implemented as any type of controller such as, for example, a processor, an ASIC, a Field Programmable Gate Array (FPGA), or the like. In particular embodiments, the controller 66 may comprise, for example, one or several general-purpose or special-purpose microprocessors or other microcontrollers programmed with suitable software and/or firmware to carry out some or all of the functionality of the controller 66 described herein. In addition or alternatively, the controller 66 may comprise various digital hardware blocks (e.g., one or more ASICs, one or more off-the-shelf digital and analog hardware components, or a combination thereof) configured to carry out some or all of the functionality of the controller 66 described herein. Additionally, in particular embodiments, the functionality of the controller 66 described herein may be implemented, in whole or in part, by the controller 66 executing software or other instructions stored on a non-transitory computer-readable medium, such as RAM, ROM, a magnetic storage device, an optical storage device, or any other suitable type of data storage components.

The local wireless interface 68 is generally any type of local wireless interface that enables a direct point-to-point local wireless connection between the RRE 54 and the wireless device 50. In one embodiment, the local wireless interface 68 is an IEEE 802.11b, IEEE 802.11g, or IEEE 802.11n wireless interface. Notably, IEEE 802.11b and IEEE 802.11g provide ranges of about 95 meters (m) (i.e., 300 feet (ft)), whereas IEEE 802.11n provides a range of about 250 m. Further, the range of the local wireless interface 68 can be extended up to several kilometers by using high gain directional antenna(s).

The CPRI monitor control subsystem 70 enables monitoring of the CPRI link between the RRE 54 and the REC 52. In particular, the CPRI monitor control subsystem 70 either activates or deactivates a CPRI monitoring subsystem (not shown) under the control of the controller 66. The CPRI monitoring subsystem can be implemented at any suitable location within the RRE 54 (e.g., within the CPRI interface 62) and generally operates to provide data that replicates traffic flow between the RRE 54 and the REC 52 over the CPRI link or some desired portion thereof (e.g., only the operations and management traffic). Thus, when the CPRI monitoring subsystem is activated, the CPRI monitoring subsystem provides a stream of data to the CPRI monitor control subsystem 70 that corresponds to the traffic flow, or the desired portion(s) of the traffic flow, between the RRE 54 and the REC 52 over the CPRI link. The CPRI monitor control subsystem 70 then provides the stream of data to the controller 66, which in turn can transmit the stream of data (i.e., the monitored traffic flow) to the wireless device 50 via the local wireless interface 68.

The LED status and control component 72 includes status information, or states (e.g., on, off, or blinking) of one or more LEDs of the RRE 54 as well as circuitry (e.g., a driver circuit) that enables the controller 66 to control the states of the LED(s) of the RRE 54. The alarm list 74 includes a list of alarms or alarm codes generated by the RRE 54 under predefined conditions. In general, the alarms are generated and stored in the alarm list 74 when some undesired event has occurred at the RRE 54. Lastly, the memory 76 is preferably implemented in or as FLASH memory or other non-volatile digital storage device that, in some embodiments, is used to store a physical location 78 of the RRE 54. The physical location 78 is data that defines the physical location of the RRE 54 in two-dimensional or three-dimensional space. In one preferred embodiment, the physical location 78 is a latitude and longitude coordinate pair.

As discussed below in detail, the RRE-MT subsystem 64 can perform numerous maintenance operations and enables the wireless device 50 to remotely access these maintenance operations via a local wireless connection between the RRE 54 and the wireless device 50. The maintenance operations that can be performed by the RRE-MT subsystem 64 and remotely accessed by the wireless device 50 include, in this example, monitoring traffic flow on the CPRI link between the REC 52 and the RRE 54 via the CPRI monitor control subsystem 70, reading alarm states of the RRE 54 from the alarm list 74, and reading and/or controlling the state of the LED(s) of the RRE 54 via the LED status and control component 72. In addition, in some embodiments, the RRE-MT subsystem 64 enables the wireless device 50 to provide the physical location of the wireless device 50 to the RRE 54. The RRE-MT subsystem 64 then stores the physical location of the wireless device 50 in the memory 76 as the physical location 78 of the RRE 54. This storing of the physical location 78 is also referred to herein as a maintenance operation. Note, however, that the maintenance operations listed above are only examples. The RRE-MT subsystem 64 may perform additional or alternative maintenance operations as desired.

Figure 7:
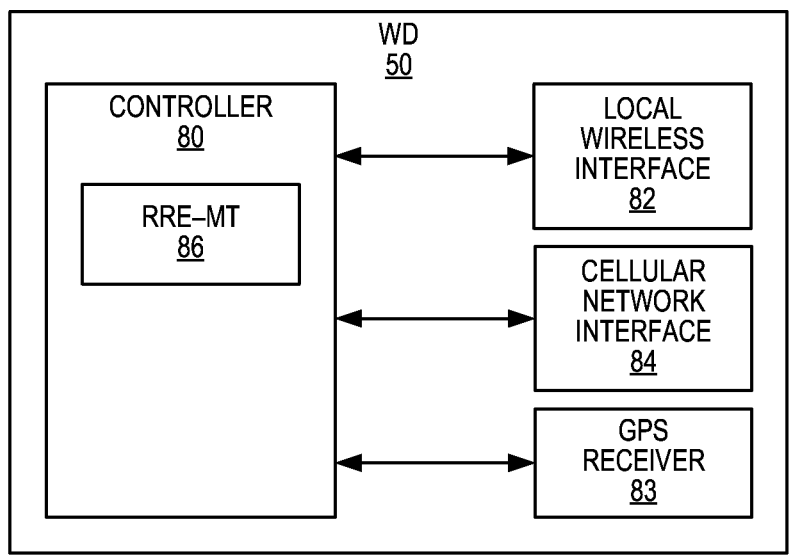
FIG. 7 is a block diagram of the wireless device of FIG. 5 that includes an RRE Maintenance Tool (RRE-MT) and a local wireless interface that enables the RRE-MT to remotely access the maintenance subsystem of the RRE of one of the base stations of FIG. 5 according to one embodiment of the present disclosure.

FIG. 7 is a block diagram of the wireless device 50 of FIG. 5 according to one embodiment of the present disclosure. As illustrated, the wireless device 50 includes a controller 80, a local wireless interface 82, a Global Positioning System (GPS) receiver 83, and in this embodiment a cellular network interface 84. In particular embodiments, the controller 80 may comprise, for example, one or several general-purpose or special-purpose microprocessors or other microcontrollers programmed with suitable software and/or firmware to carry out some or all of the functionality of the controller 80 described herein. In addition or alternatively, the controller 80 may comprise various digital hardware blocks (e.g., one or more ASICs, one or more off-the-shelf digital and analog hardware components, or a combination thereof) configured to carry out some or all of the functionality of the controller 80 described herein. Additionally, in particular embodiments, the functionality of the controller 80 described herein may be implemented, in whole or in part, by the controller 80 executing software or other instructions stored on a non-transitory computer-readable medium, such as RAM, ROM, a magnetic storage device, an optical storage device, or any other suitable type of data storage components. In particular, in this embodiment, a RRE-MT 86 is implemented in software and executed by the controller 80.

The RRE-MT 86 enables the wireless device 50 to access the RRE-MT subsystem 64 of the RRE 54 via the local wireless interface 82. The local wireless interface 82 is generally any type of local wireless interface that enables a direct point-to-point local wireless connection between the wireless device 50 and the RRE 54. In one embodiment, the local wireless interface 82 is an IEEE 802.11b, IEEE 802.11g, or IEEE 802.11n wireless interface. The GPS receiver 83 operates to determine a physical location of the wireless device 50. Note, however, that other location determination mechanisms can be used and, as such, the determination of the physical location of the wireless device 50 is not limited to the use of the GPS receiver 83. The cellular communications interface 84 is optional and may, in some embodiments, be used by the wireless device 50 to send and receive information (i.e., voice and/or data) via the cellular communications network 36 (FIG. 5).

Figure 8:
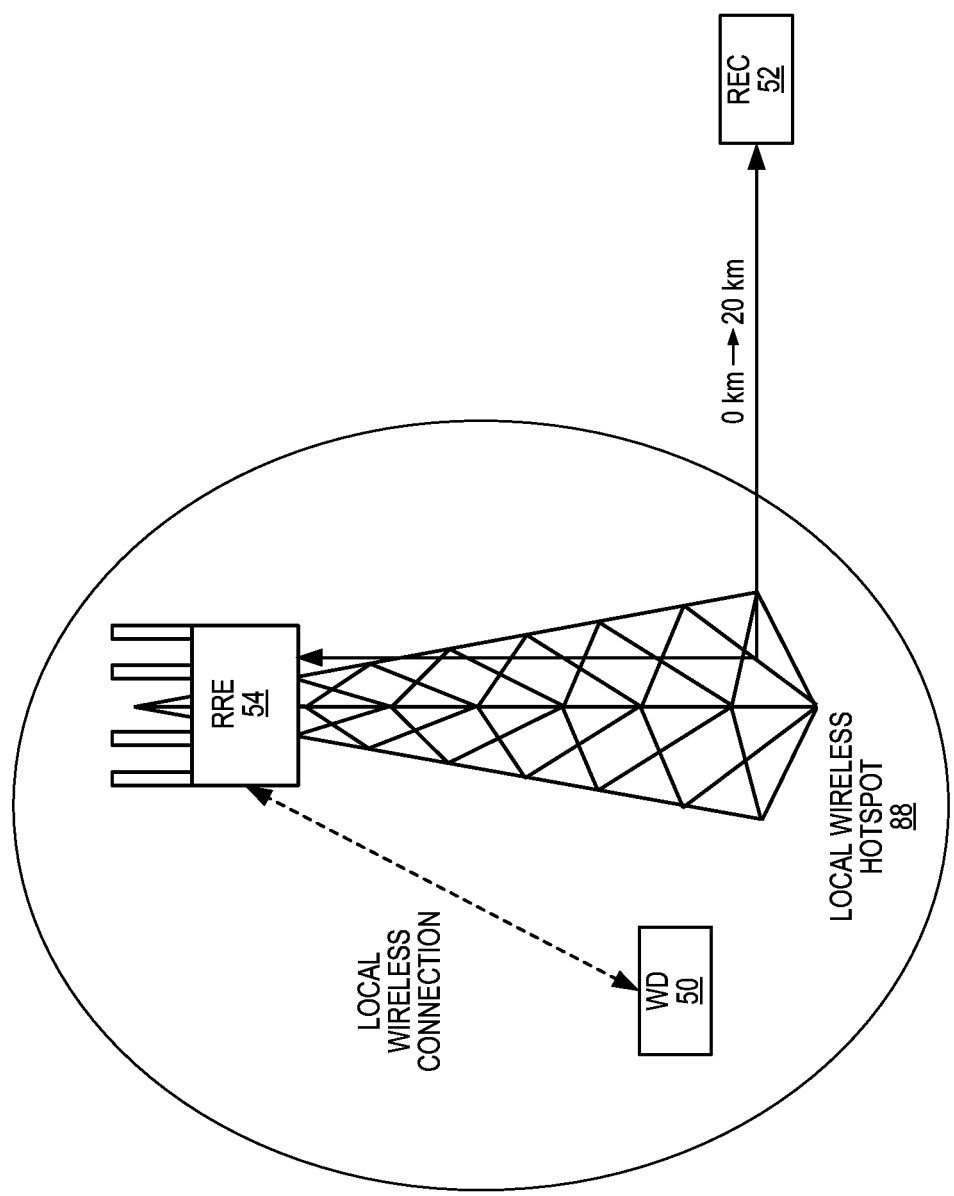
FIG. 8 illustrates a hotspot hosted by the wireless device of FIG. 5 to enable local wireless access to the maintenance subsystem of the RRE of one of the base stations of FIG. 5 according to one embodiment of the present disclosure.

In one embodiment, the wireless device 50 creates, or hosts, a local wireless hotspot 88 (hereinafter simply "hotspot 88") via the local wireless interface 82 of the wireless device 50, as illustrated in FIG. 8. In one preferred embodiment, the hotspot 88 is a WiFi hotspot. When the RRE 54 is located within the hotspot 88, the local wireless interface 68 of the RRE 54 connects to the hotspot 88 to thereby establish a local wireless connection with the wireless device 50. Preferably, the local wireless connection is a secure connection. For example, in one preferred embodiment, WPA2 is used to encrypt all traffic in the hotspot 88. WPA2 is a full interoperable implementation of IEEE 802.11i, which makes use of the Advanced Encryption Standard (AES) block cipher. AES is a specification for the encryption of electronic data established by the U.S. National Institute of Standards and Technology (NIST) in 2001. While not essential for understanding the concepts disclosed and claimed herein, security may be further enhanced by an absence timer as disclosed in U.S. patent application Ser. No. 13/674,309, which was filed Mar. 2, 2012 and is hereby incorporated herein by reference with respect to its teachings related to security enhancement using an absence timer. It should be noted that while the wireless device 50 hosts the hotspot 88 in the embodiment of FIG. 8 as well as many of the embodiments discussed below, the hotspot 88 may alternatively be hosted by the RRE 54. For security purposes, it may be beneficial for the wireless device 50 to host the hotspot 88 where the RRE 54 listens for the hotspot 88. However, with enhanced security measures such as pre-installed certificates, the hotspot 88 may alternatively be hosted by the RRE 54 while still maintaining a desirable level of security.

Figure 9:
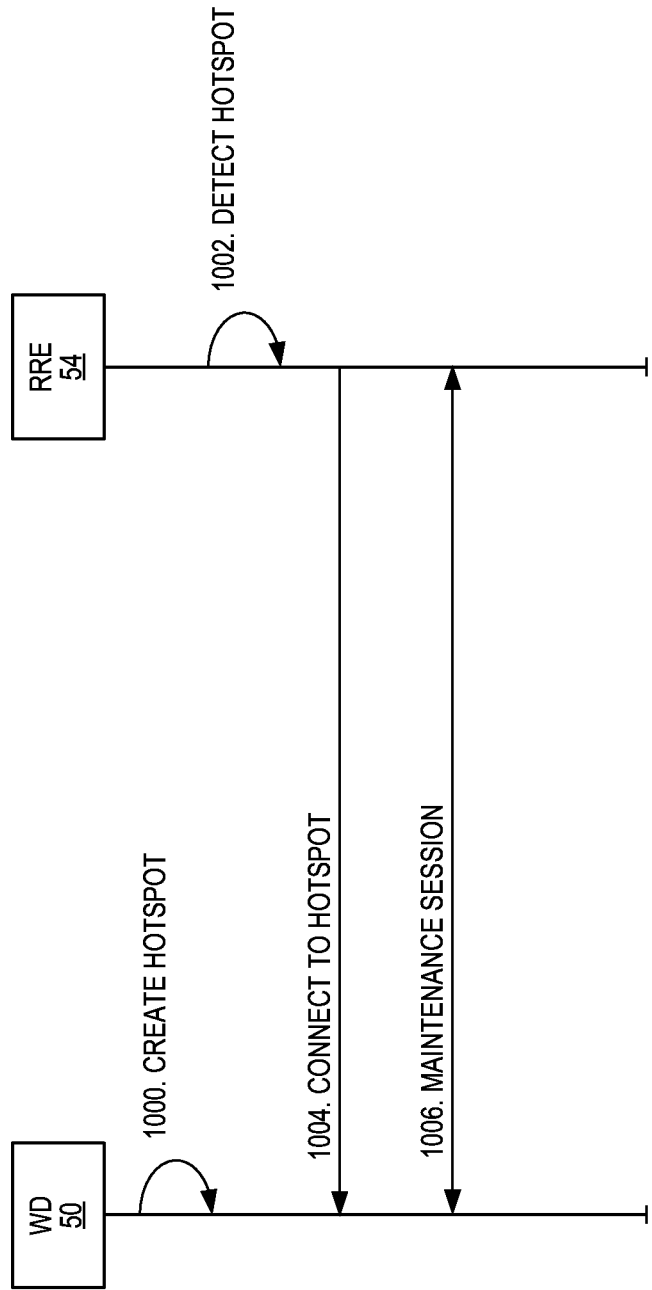
FIG. 9 illustrates the operation of the wireless device and the RRE of one of the base stations of FIG. 5 to provide remote access to the maintenance subsystem of the base station according to one embodiment of the present disclosure.

FIG. 9 illustrates the operation of the wireless device 50 and the RRE 54 of the base station 38-1 to provide remote access to the RRE-MT subsystem 64 of the RRE 54 according to one embodiment of the present disclosure. As illustrated, the wireless device 50 creates and hosts the hotspot 88 as illustrated with respect to FIG. 8 (step 1000). More specifically, the RRE-MT 86 of the wireless device 50 controls the local wireless interface 82 of the wireless device 50 to create and host the hotspot 88. Next, the local wireless interface 68 of the RRE 54 detects the hotspot 88 (step 1002). Upon detecting the hotspot 88, the controller 66 of the RRE-MT subsystem 64 of the RRE 54 controls the local wireless interface 68 to connect to the hotspot 88, thereby establishing a local wireless connection between the RRE 54 and the wireless device 50 (step 1004). Connecting to the hotspot 88 preferably requires some security mechanism such as, for example, a passphrase, a digital certificate, or the like. If a passphrase is used, the passphrase can be, but is not limited to, a predetermined passphrase for the hotspot 88. Again, in an alternative embodiment, the hotspot 88 is created and hosted by the RRE 54. In this alternative embodiment, the wireless device 50 detects the hotspot 88 and, in response, connects to the hotspot 88 to thereby establish a local wireless connection between the wireless device 50 and the RRE 54.

Once the local wireless connection is established, a maintenance session is conducted via the local wireless connection (step 1006). More specifically, in one embodiment, preferably under control of an operator of the wireless device 50, the RRE-MT 86 of the wireless device 50 sends one or more maintenance requests to the RRE-MT subsystem 64 of the RRE 54 via the local wireless connection in order to cause the RRE-MT subsystem 64 of the RRE 54 to perform corresponding maintenance operations. The one or more maintenance requests may include a request to monitor traffic flow between the RRE 54 and the REC 52 over the CPRI link, a request to monitor the operation of the RRE 54, a request for alarms in the alarm list 74 of the RRE 54, a request for the state(s) of the LED(s) of the RRE 54, a request to change the state(s) of the LED(s) of the RRE 54, or the like. In one particular embodiment discussed below in detail, the maintenance request is a request to store a provided physical location in the memory 76 of the RRE 54 as the physical location 78 of the RRE 54. Again, the types of maintenance requests given above are only examples. The present disclosure is not limited thereto. For instance, some other types of maintenance requests that may be made by the RRE-MT 86 include a request for a unique identifier of the RRE 54 (e.g., a serial number of the RRE 54), a request to reset the RRE 54, a request for the RRE 54 to provide transmit blocking, a request to control transmit output power (e.g., a request to fine tune and calibrate a transmit power level of the radio subsystem 60), a request to adjust a CPRI block configuration for the CPRI link, or any type of request to configure any subsystem of the RRE 54.

In response to the maintenance request, the RRE-MT subsystem 64 performs one or more actions indicated by the maintenance request. For instance, if the maintenance request is a request to monitor traffic flow over the CPRI link between the RRE 54 and the REC 52, the controller 66 causes the CPRI monitor control subsystem 70 to activate the CPRI monitoring subsystem. As a result of CPRI monitoring, the traffic flow between the RRE 54 and the REC 52 over the CPRI link, or some desired portion thereof (e.g., control and/or management data), is returned to the controller 66. The controller 66 then provides the monitored traffic flow to the wireless device 50 via the local wireless connection. At the wireless device 50, the RRE-MT 86 stores and/or presents the monitored traffic flow for analysis.

As another example, if the maintenance request is a request for alarms in the alarm list 74 of the RRE 54, the controller 66 reads the alarms from the alarm list 74 and returns the alarms to the wireless device 50 via the local wireless connection. The RRE-MT 86 of the wireless device 50 then stores the alarms and/or presents the alarms for analysis. As another example, if the maintenance request is a request for the state(s) of the LED(s) of the RRE 54, the controller 66 reads the state(s) of the LED(s) from the LED status and control component 72 and returns the state(s) of the LED(s) to the wireless device 50 via the local wireless connection. The RRE-MT 86 then stores the state(s) and/or presents the state(s) for analysis. As another example, if the maintenance request is a request to change the state(s) of the LED(s) of the RRE 54 (e.g., a request to blink the LED(s)), the controller 66 causes the LED status and control component 72 to change the state(s) of the LED(s) accordingly.

Using the process of FIG. 9, the operator of the wireless device 50 is enabled to remotely perform various maintenance tasks without the need to physically access the RRE 54 by climbing a tower and/or accessing rental property. As a result, the operator of the wireless device 50 can perform maintenance operations in a much more cost and time efficient manner. Further, risk to the operator and thus liability to the network operator is substantially reduced by avoiding the need to physically access the RRE 54 unless there is a need to uninstall the RRE 54 for maintenance or repair. This is a vast improvement over RREs that require a wired connection to perform maintenance operations. Also, avoiding the need for a physical connection port for maintenance operations reduces material costs, decreases failure points, and eliminates the need to occupy space on a faceplate of the RRE 54 for the physical connection port.

Thus far, the discussion has focused on remote access to the RRE-MT subsystem 64 of the RRE 54 via a local wireless connection. FIGS. 10 through 13 illustrate embodiments in which the local wireless connection is utilized to perform a particular maintenance operation, namely, storing a precise and accurate location of the RRE 54 as well as subsequently locating and identifying the RRE 54 when needed. This maintenance operation is particularly beneficial for embodiments where the base stations 38 are small, or low power, base stations 38 and, as such, the RREs 54 are small, or low power, RREs 54. Thus, for the discussion of FIGS. 10 through 13, the RREs 54 are referred to as sRREs 54. However, it should be noted that while the discussion of FIGS. 10 through 13 focuses on sRREs 54, the concepts described with respect to FIGS. 10 through 13 may additionally or alternatively be used for the RREs 54 of high power base stations 38.

Figure 10:
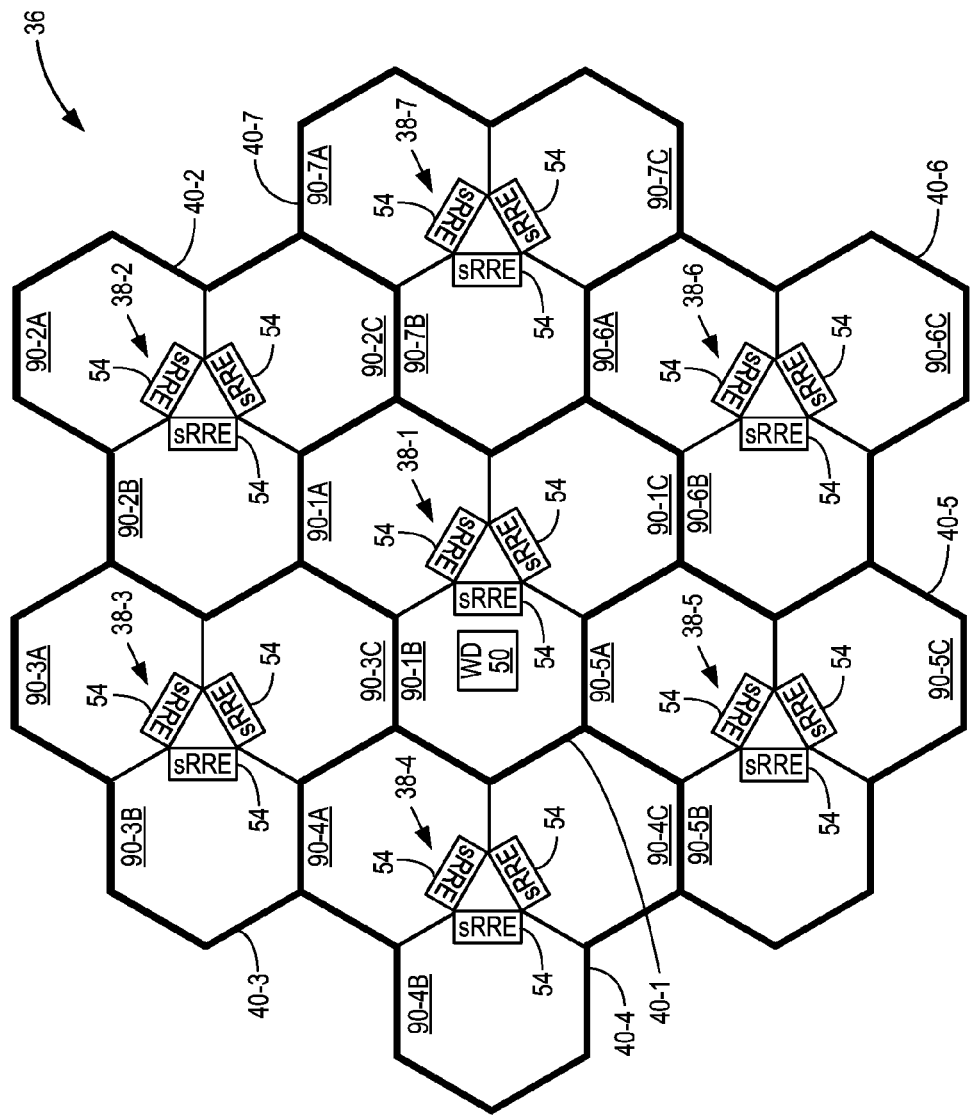
FIG. 10 illustrates a number of small, or low power, RREs serving a coverage area within a cellular communications network wherein the small RREs are equipped with local wireless interfaces that enable remote access to the small RREs via local wireless communication according to one embodiment of the present disclosure.

FIG. 10 illustrates another embodiment of the cellular communications network 36 that includes a number of base stations 38-1 through 38-7 each including three sRREs 54 providing coverage for different sectors 90, or coverage areas, within the corresponding cells 40-1 through 40-7 served by the base stations 38-1 through 38-7 according to one embodiment of the present disclosure. In this embodiment, the base stations 38 are, for example, micro or pico base stations in a heterogeneous LTE network. The sRREs 54 for the cell 40-1 provide coverage for corresponding sectors 90-1A, 90-1B, and 90-1C within the cell 40-1, the sRREs 54 for the cell 40-2 provide coverage for corresponding sectors 90-2A, 90-2B, and 90-2C, etc. The sectors 90-1A through 90-7C illustrated in FIG. 10 are more generally referred to herein as sectors 90.

While not illustrated, the sRREs 54 for the cell 40-1 are connected to a corresponding REC 52 of the base station 38-1, the sRREs 54 for the cell 40-2 are connected to a corresponding REC 52 of the base station 38-2, and so on. Thus, in this embodiment, the baseband processing for the three sRREs 54 in a cell 40 is centralized at a single REC 52. However, in one alternative embodiment, each of the sRREs 54 may have its own REC 52.

Figure 11:
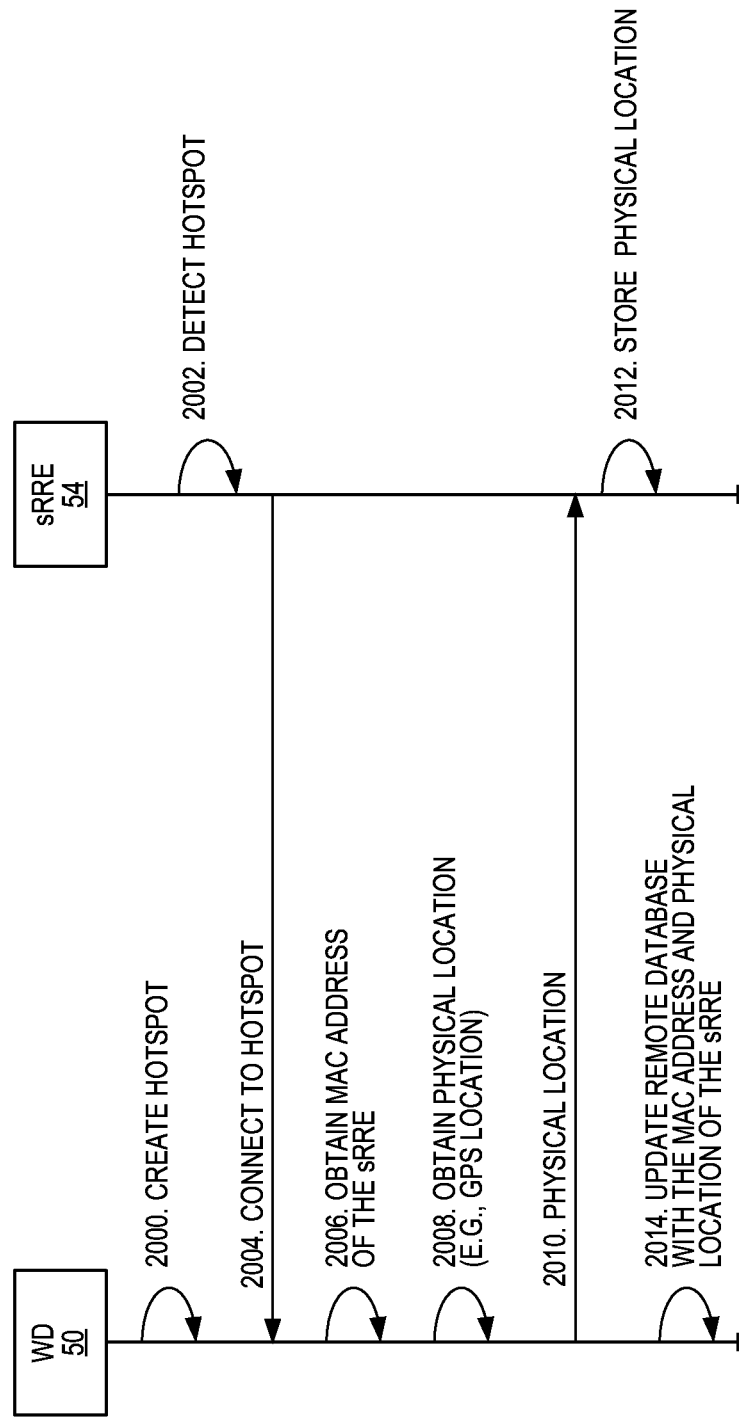
FIG. 11 illustrates the operation of a wireless device and one of the small RREs of FIG. 10 to determine and store a physical location of the small RRE according to one embodiment of the present disclosure.

FIG. 11 illustrates the operation of the wireless device 50 and one of the sRREs 54 of FIG. 10 to provide precise and accurate positioning of the sRRE 54 according to one embodiment of the present disclosure. This process may be performed, for instance, during commissioning or installation of the sRREs 54. As illustrated, the wireless device 50 creates and hosts the hotspot 88 in the manner discussed above (step 2000). More specifically, the RRE-MT 86 of the wireless device 50 controls the local wireless interface 82 of the wireless device 50 to create and host the hotspot 88. Next, the local wireless interface 68 of the sRRE 54 detects the hotspot 88 (step 2002). Upon detecting the hotspot 88, the controller 66 of the RRE-MT subsystem 64 of the sRRE 54 controls the local wireless interface 68 to connect to the hotspot 88, thereby establishing a local wireless connection between the sRRE 54 and the wireless device 50 (step 2004). Connecting to the hotspot 88 preferably requires some security mechanism such as, for example, a passphrase, a digital certificate, or the like. If a passphrase is used, the passphrase can be, but is not limited to, a predetermined passphrase for the hotspot 88. Again, in an alternative embodiment, the hotspot 88 is created and hosted by the sRRE 54. In this alternative embodiment, the wireless device 50 detects the hotspot 88 and, in response, connects to the hotspot 88 to thereby establish a local wireless connection between the wireless device 50 and the sRRE 54.

In this embodiment, the wireless device 50 obtains a MAC address of the local wireless interface 68 of the sRRE 54 (step 2006). More specifically, the RRE-MT 86 instructs the controller 80 of the wireless device 50 to obtain the MAC address of the local wireless interface 68 of the sRRE 54 from the local wireless interface 82 of the wireless device 50. While illustrated as a separate step for clarity and ease of discussion, the local wireless interface 82 of the wireless device 50 may obtain the MAC address of the local wireless interface 68 of the sRRE 54 when exchanging messages with the local wireless interface 82 during setup of the local wireless connection. As discussed below, the MAC address of the local wireless interface 68 of the sRRE 54 is utilized as a unique identifier for the sRRE 54. However, the MAC address of the local wireless interface 68 is only one example of a unique identifier for the sRRE 54. Any unique identifier of the sRRE 54 may be used. For example, a serial number of the sRRE 54 may alternatively be used. In this case, the wireless device 50 can send a request for the unique identifier of the sRRE 54 (e.g., the serial number of the sRRE 54) to the sRRE 54 and receive the unique identifier of the sRRE 54 via the local wireless connection.

In addition, the RRE-MT 86 instructs the controller 80 of the wireless device 50 to obtain the physical location of the wireless device 50 (step 2008). In this embodiment, the physical location of the wireless device 50 is obtained from the GPS receiver 83 of the wireless device 50. However, again, the GPS receiver 83 is only an example. Other location determination mechanisms may be used. Next, in this embodiment, the RRE-MT 86 instructs the controller 80 to send the physical location of the wireless device 50 to the sRRE 54 as the physical location 78 of the sRRE 54 (step 2010). More specifically, in one embodiment, the RRE-MT 86 sends a maintenance request to the RRE-MT subsystem 64 of the sRRE 54 to store a provided physical location, which is the physical location of the wireless device 50 obtained in step 2008), as the physical location 78 of the sRRE 54. In response, the RRE-MT subsystem 64 of the sRRE 54 stores the physical location provided by the wireless device 50 in the memory 76 as the physical location 78 of the sRRE 54 (step 2012). The physical location 78 of the sRRE 54 may then be utilized by the RRE 54 and/or the cellular communications network 36 in any desired manner. For example, a main operation office of the cellular communications network 36 may request the physical location 78 of the sRRE 54 via the CPRI link with the REC 52. It should be noted that steps 2010 and 2012 are not necessary. Thus, in some embodiments, the physical location of the wireless device 50 is not provided to and stored by the sRRE 54 as the physical location 78 of the sRRE 54.

At the wireless device 50, the RRE-MT 86 further instructs the controller 80 to update a remote database with the MAC address of the local wireless interface 68 of the sRRE 54 (or other unique identifier of the sRRE 54) and the physical location 78 of the sRRE 54 (step 2014). Again, the physical location 78 of the sRRE 54 is the physical location of the wireless device 50 obtained in step 2008. The MAC address serves to resolve ambiguity if multiple sRREs 54 are at the same physical location. The manner in which the remote database is updated may vary depending on the particular implementation. In one embodiment, the RRE-MT 86 instructs the controller 80 to communicate the MAC address and the physical location of the sRRE 54 to the remote database via the cellular network interface 84 of the wireless device 50. In another embodiment, the RRE-MT 86 instructs the controller 80 to store the MAC address and the physical location of the sRRE 54 for subsequent transfer to the remote database.

In one embodiment, the remote database is a planning and inventory database maintained by an operator of the cellular communications network 36. As such, using the process of FIG. 11, the planning and inventory database provides an up-to-date view of the cellular communications network 36. Using the planning and inventory database, any unintentional error such as the installation of an sRRE 54 at a physical location other than the planned physical location can be immediately detected at the time of installation.

Figure 12:
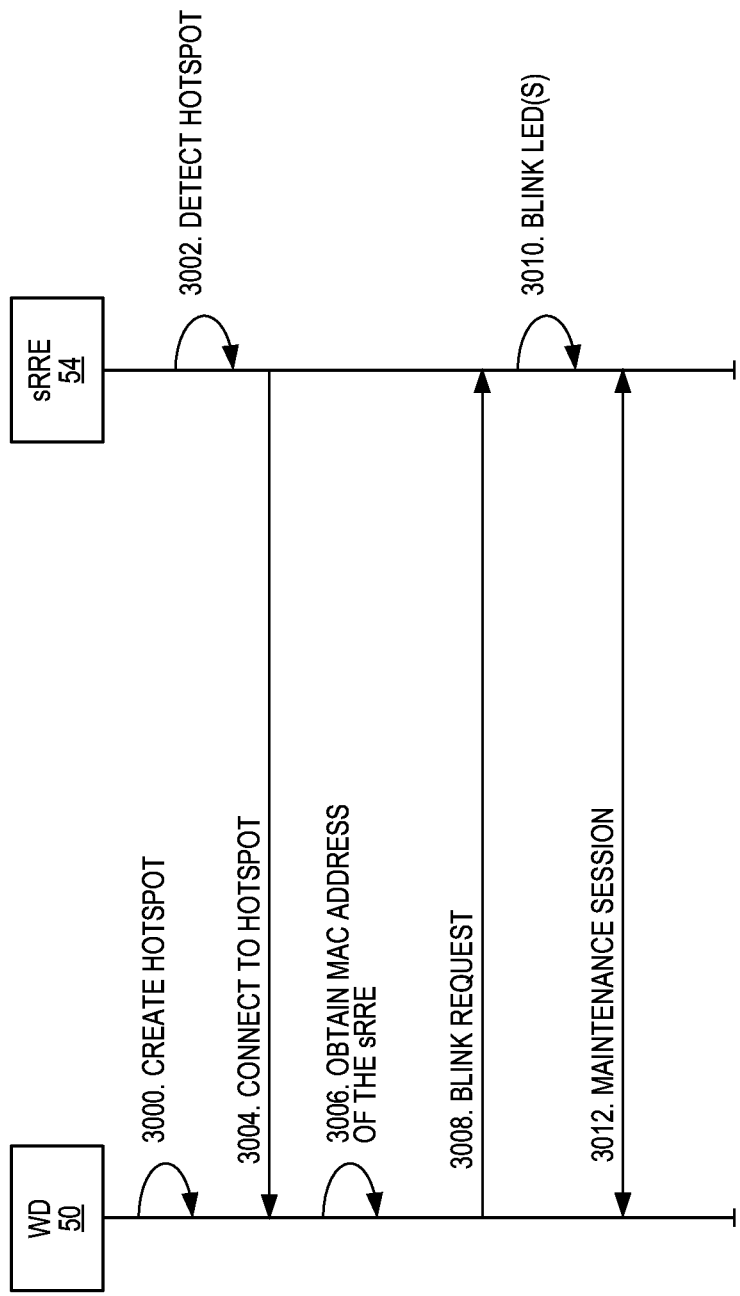
FIG. 12 illustrates the operation of the wireless device to locate a desired one of the small RREs of FIG. 10 using a previously determined and stored physical location of the desired small RRE according to one embodiment of the present disclosure.

Using the process of FIG. 11, precise and accurate locations of the sRREs 54 are maintained in the remote database. Thus, even if the sRREs 54 are deployed or installed at physical locations other than those originally planned, the process of FIG. 11 can be used by maintenance or field support personnel during installation to quickly and easily record the physical locations of the sRREs 54 at the time of installation. The physical locations of the sRREs 54 maintained in the remote database can subsequently be used to locate and identify sRREs 54 of interest. In this regard, FIG. 12 illustrates a process for locating and identifying an sRRE 54 of interest using the physical location and MAC address of the sRRE 54 previously obtained via the process of FIG. 11 according to one embodiment of the present disclosure.

During service, when it is desired to locate and identify one of the sRREs 54, a maintenance or field support person obtains the physical address and the MAC address of the sRRE 54 from the remote database. For example, a ticket may be provided to the maintenance or field support person, where the ticket includes the physical location and the MAC address of an sRRE 54 to be serviced. The operator of the wireless device 50 (e.g., the maintenance or field support person) then goes to the physical location of the sRRE 54 to be serviced.

Once at the physical location of the sRRE 54 to be serviced, the wireless device 50 creates the wireless hotspot 88 (step 3000). More specifically, the RRE-MT 86 of the wireless device 50 controls the local wireless interface 82 of the wireless device 50 to create and host the hotspot 88. Next, the local wireless interface 68 of the sRRE 54 detects the hotspot 88 (step 3002). Upon detecting the hotspot 88, the controller 66 of the RRE-MT subsystem 64 of the sRRE 54 controls the local wireless interface 68 to connect to the hotspot 88, thereby establishing a local wireless connection between the sRRE 54 and the wireless device 50 (step 3004). Connecting to the hotspot 88 preferably requires some security mechanism such as, for example, a passphrase, a digital certificate, or the like. If a passphrase is used, the passphrase can be, but is not limited to, a predetermined passphrase for the hotspot 88. Again, in an alternative embodiment, the hotspot 88 is created and hosted by the sRRE 54. In this alternative embodiment, the wireless device 50 detects the hotspot 88 and, in response, connects to the hotspot 88 to thereby establish a local wireless connection between the wireless device 50 and the sRRE 54.

The wireless device 50 also obtains a MAC address of the local wireless interface 68 of the sRRE 54 (step 3006). More specifically, the RRE-MT 86 instructs the controller 80 of the wireless device 50 to obtain the MAC address of the local wireless interface 68 of the sRRE 54 from the local wireless interface 82 of the wireless device 50. While illustrated as a separate step for clarity and ease of discussion, the local wireless interface 82 of the wireless device 50 may obtain the MAC address of the local wireless interface 68 of the sRRE 54 when exchanging messages with the local wireless interface 82 during setup of the local wireless connection. Again, it should be noted that the MAC address of the local wireless interface 68 is only one example of a unique identifier for the sRRE 54. Any unique identifier of the sRRE 54 may be used. For example, a serial number of the sRRE 54 may alternatively be used. In this case, the wireless device 50 can send a request for the unique identifier of the sRRE 54 (e.g., the serial number of the sRRE 54) to the sRRE 54 and receive the unique identifier of the sRRE 54 via the local wireless connection.

If the MAC address (or other unique identifier) of the sRRE 54 does not match the MAC address of the sRRE 54 to be serviced, then this particular sRRE 54 is not the sRRE 54 to be serviced. This may occur in installations where, for example, multiple sRREs 54 are installed at the same physical location (e.g., mounted on the same pole or mast) or where multiple sRREs 54 are within local wireless range of the wireless device 50. However, in this example, the MAC address of the sRRE 54 matches the MAC address of the sRRE 54 to be serviced.

Next, in this embodiment, in order for the operator of the wireless device 50 to visually identify the sRRE 54 of interest, the RRE-MT 86 instructs the controller 80 of the wireless device 50 to send a blink request to the sRRE 54 (step 3008). In this embodiment, the blink request is provided in the form of a maintenance request to the RRE-MT subsystem 64 of the sRRE 54. In response, the controller 66 of the RRE-MT subsystem 64 of the sRRE 54 controls one or more of the LED(s) of the sRRE 54 to blink such that the operator of the sRRE 54 can visually identify the sRRE 54 of interest (step 3010). Again, this may be beneficial when, for example, multiple sRREs 54 are installed on the same pole or mast or are otherwise deployed at or near the same physical location. At this point, if desired, a maintenance session may be conducted in the manner described above (step 3012).

Figure 13:
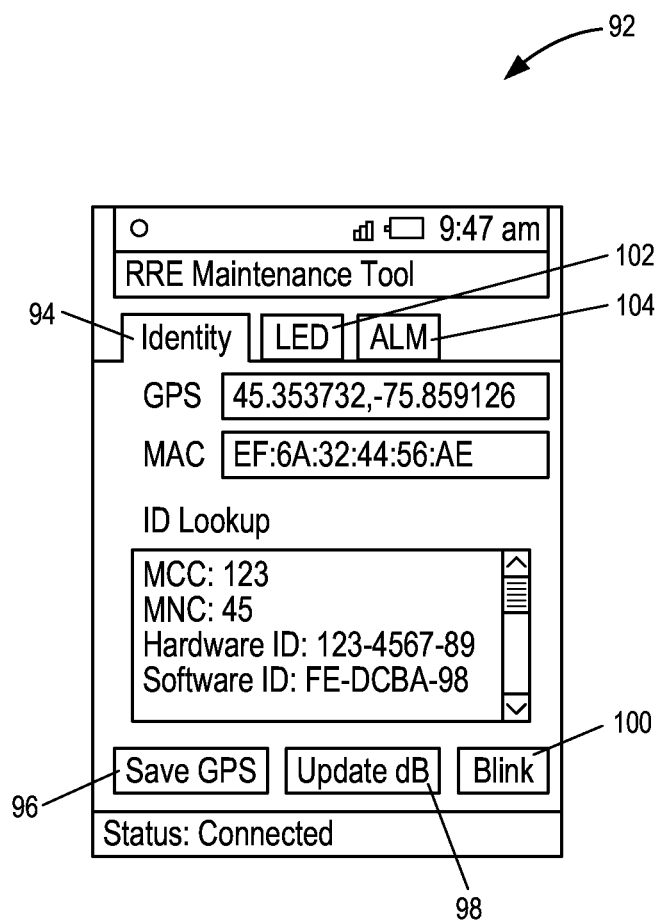
FIG. 13 is one example of a graphical user interface of the wireless device of FIG. 10 according to one embodiment of the present disclosure.

FIG. 13 illustrates one example of a Graphical User Interface (GUI) 92 of the RRE-MT 86 according to one embodiment of the present disclosure. As illustrated, when an Identity tab 94 is selected, the GUI 92 presents the physical location of the wireless device 50 obtained from the GPS receiver 83, the MAC address of the sRRE 54 to which the wireless device 50 is connected, and various information obtained from a lookup for the MAC address of the sRRE 54 (e.g., hardware ID, software ID, etc.). If the operator of the wireless device 50 desires to send the physical location of the wireless device 50 to the sRRE 54 to be stored as the physical location 78 of the sRRE 54, the operator selects a Save GPS button 96. Upon selecting the Save GPS button 96, the physical location (i.e., the GPS location) of the wireless device 50 is sent to the sRRE 54 via the local wireless connection where the physical location is stored as the physical location 78 of the sRRE 54. Further, if the operator of the wireless device 50 desires to update the remote database with the MAC address and the physical location of the sRRE 54, the operator selects an Update dB button 98. In response, in this embodiment, the RRE-MT 86 instructs the controller 80 to update the remote database with the MAC address and the physical location of the sRRE 54. Still further, if the operator desires to blink one or more LED(s) of the sRRE 54 for visual identification of the sRRE 54, the operator selects a Blink button 100. In response, the RRE-MT 86 instructs the controller 80 to send a maintenance request to blink the LED(s) of the sRRE 54 via the local wireless connection.

Lastly, the GUI 92 includes an LED tab 102 and an ALM tab 104. The operator of the wireless device 50 can select the LED tab 102 to view status information for the LED(s) of the sRRE 54 which, as discussed above, can be obtained from the sRRE 54 via the local wireless connection using a corresponding maintenance request. Similarly, the operator of the wireless device 50 can select the ALM tab 104 to view any alarms obtained from the sRRE 54 via the local wireless connection using a corresponding maintenance request.

While not limited by any particular advantages, the embodiments of FIGS. 10 through 13 provide numerous advantages over conventional techniques for locating and identifying sRREs 54 of interest. For instance, the embodiments of FIGS. 10 through 13 simplify management of sRRE 54 locations particularly in an ad-hoc network and give the ability to track lost or misplaced sRREs 54. In addition, by further using the remote maintenance operations discussed with respect to FIGS. 5 through 9, maintenance or field support personnel are enabled to quickly and easily assess the sRREs 54 before having to arrange for equipment (e.g., scaffolding or a hydraulic lift) to reach the sRREs 54.

As a final note, while embodiments described above focus on the RREs 54 and the sRREs 54, the concepts described herein are not limited to RREs. More specifically, the concepts described herein are equally applicable to REs and small REs that are co-located with their corresponding RECs.

The following acronyms are used throughout this disclosure.

3GPP 3$^{rd}$ Generation Partnership Project
AES Advanced Encryption Standard
ASIC Application Specific Integrated Circuit
BS Base Station
CPRI Common Public Radio Interface
FPGA Field Programmable Gate Array
ft Foot
GPRS General Packet Radio Service
GPS Global Positioning System
GSM Global System for Mobile Communications
GUI Graphical User Interface
HSPA High Speed Packet Access
km Kilometer
LED Light Emitting Diode
LTE Long Term Evolution
m Meter
MAC Media Access Control
MME Mobility Management Entity
MT Mobile Terminal
NIST National Institute of Standards and Technology
RAM Random Access Memory
RAN Radio Access Network
REC Radio Equipment Controller
ROM Read Only Memory
RE Radio Equipment
RRE Remote Radio Equipment
RRE-MT Remote Radio Equipment Maintenance Tool
S-GW Serving Gateway
W Watt
WD Wireless Device Those skilled in the art will recognize improvements and modifications to the preferred embodiments of the present disclosure. All such improvements and modifications are considered within the scope of the concepts disclosed herein and the claims that follow.

What is claimed is:

1. A radio equipment of a base station of a cellular communications network, comprising:
   a radio subsystem that transmits and receives radio signals for the cellular communications network;
   a local wireless interface; and
   a controller associated with the local wireless interface that is configured to:
      provide access to a maintenance subsystem of the radio equipment via a local wireless connection between the radio equipment and a wireless device established via the local wireless interface by being configured to:
         receive a physical location of the wireless device via the local wireless connection; and
         store the physical location of the wireless device as a physical location of the radio equipment;
      receive a maintenance request from the wireless device via the local wireless connection; and
      in response to receiving the maintenance request, perform one or more actions indicated by the maintenance request where the one or more actions are selected from the group consisting of:
         monitoring traffic flow between the radio equipment and an associated radio equipment controller and returning resulting monitored traffic flow data to the wireless device via the local wireless connection;
         obtaining a status of the radio equipment and returning the status of the radio equipment to the wireless device via the local wireless connection;
         resetting the radio equipment;
         providing transmit blocking;
         providing transmit output control;
         obtaining a state of one or more LEDs of the radio equipment and returning the state of the one or more LEDs to the wireless device via the local wireless connection;
         controlling the state of the one or more LEDs of the radio equipment; and
         monitoring operation of the radio equipment and providing resulting monitoring data to the wireless device via the local wireless connection.

2. The radio equipment of claim 1 wherein the controller is further configured to control the local wireless interface to connect to a hotspot hosted by the wireless device to thereby establish the local wireless connection between the radio equipment and the wireless device.

3. The radio equipment of claim 1 wherein the controller is further configured to control the local wireless interface to create a hotspot, wherein the wireless device connects to the hotspot to thereby establish the local wireless connection between the radio equipment and the wireless device.

4. The radio equipment of claim 1 wherein the controller is further configured to enable the wireless device to access the maintenance subsystem to monitor the radio equipment via the local wireless interface.

5. The radio equipment of claim 1 wherein the controller is further configured to enable the wireless device to access the maintenance subsystem to monitor traffic flow between the radio equipment and the associated radio equipment controller via the local wireless interface.

6. The radio equipment of claim 1 wherein the controller is further configured to enable the wireless device to access the maintenance subsystem to have local control of the radio equipment via the local wireless interface.

7. The radio equipment of claim 1 wherein the one or more actions is monitoring traffic flow between the radio equipment and the associated radio equipment controller and returning the resulting monitored traffic flow data to the wireless device via the local wireless connection.

8. The radio equipment of claim 1 wherein the one or more actions is obtaining the status of the radio equipment and returning the status of the radio equipment to the wireless device via the local wireless connection.

9. The radio equipment of claim 1 wherein the one or more actions is resetting the radio equipment.

10. The radio equipment of claim 1 wherein the one or more actions is providing transmit blocking.

11. The radio equipment of claim 1 wherein the one or more actions is obtaining the state of one or more LEDs of the radio equipment and returning the state of the one or more LEDs to the wireless device via the local wireless connection.

12. The radio equipment of claim 1 wherein the one or more actions is controlling the state of the one or more LEDs of the radio equipment.

13. The radio equipment of claim 1 wherein the one or more actions is monitoring the operation of the radio equipment and providing the resulting monitoring data to the wireless device via the local wireless connection.

14. A method of operation of a radio equipment of a base station in a cellular communications network, comprising:
    establishing a local wireless connection to a wireless device via a local wireless interface of the radio equipment by:
        receiving a physical location of the wireless device via the local wireless connection; and
        storing the physical location of the wireless device as a physical location of the radio equipment;
    receiving a maintenance request from the wireless device via the local wireless connection; and
    in response to receiving the maintenance request, performing one or more actions indicated by the maintenance request where the one or more actions are selected from a group consisting of:
        monitoring traffic flow between the radio equipment and an associated radio equipment controller and returning resulting monitored traffic flow data to the wireless device via the local wireless connection;
        obtaining a status of the radio equipment and returning the status of the radio equipment to the wireless device via the local wireless connection;
        resetting the radio equipment;
        providing transmit blocking;
        providing transmit output control;
        obtaining a state of one or more LEDs of the radio equipment and returning the state of the one or more LEDs to the wireless device via the local wireless connection;
        controlling the state of the one or more LEDs of the radio equipment; and
        monitoring operation of the radio equipment and providing resulting monitoring data to the wireless device via the local wireless connection.

15. The method of claim 14 wherein establishing the local wireless connection to the wireless device comprises connecting to a hotspot hosted by the wireless device.

16. The method of claim 14 wherein establishing the local wireless connection to the wireless device comprises establishing a hotspot, and the local wireless connection is a result of the wireless device connecting to the hotspot.

17. A wireless device comprising:
    a local wireless interface; and
    a controller associated with the local wireless interface configured to:
        obtain a physical location of the wireless device;
        send the physical location of the wireless device to the radio equipment as a physical location of the radio equipment via a local wireless connection established between the wireless device and the radio equipment;
        access a maintenance subsystem of a radio equipment of a base station of a cellular communications network via the local wireless connection via the local wireless interface; and
        send a maintenance request to the maintenance subsystem of the radio equipment of the base station via the local wireless connection where the maintenance request is selected from the group consisting of:
            a request to reset the radio equipment;
            a request for the radio equipment to provide transmit blocking;
            a transmit output control request;
            a request to control a state of one or more LEDs of the radio equipment;
            a request to monitor traffic flow between the radio equipment and an associated radio equipment controller;
            a request for a status of the radio equipment;
            a request for a state of one or more LEDs of the radio equipment and returning the state of the one or more LEDs to the wireless device via the local wireless connection; and
            a request to monitor operation of the radio equipment.

18. The wireless device of claim 17 wherein, in order to establish the local wireless connection, the controller is further configured to:
    create a hotspot via the local wireless interface, where the local wireless connection is a connection to the hotspot.

19. The wireless device of claim 17 wherein, in order to establish the local wireless connection, the controller is further configured to:
    connect to a hotspot hosted by the radio equipment via the local wireless interface to thereby establish the local wireless connection between the wireless device and the radio equipment.

20. The wireless device of claim 17 wherein the controller is further configured to update a remote database to include the physical location of the wireless device as the physical location of the radio equipment.

21. The wireless device of claim 17 wherein the controller is further configured to:
 obtain a unique identifier of the radio equipment; and
 update a remote database to include the unique identifier of the radio equipment and the physical location of the wireless device as the physical location of the radio equipment.

* * * * *